Oct. 20, 1931.        W. WESTLING        1,828,452
AUXILIARY SPRING FOR AN ENGINE SUPPORT
Filed Oct. 29, 1930
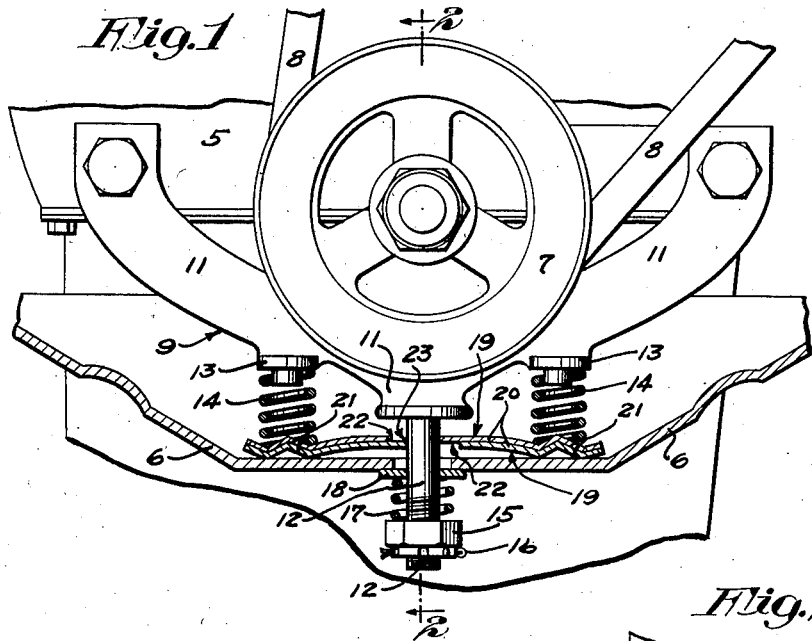
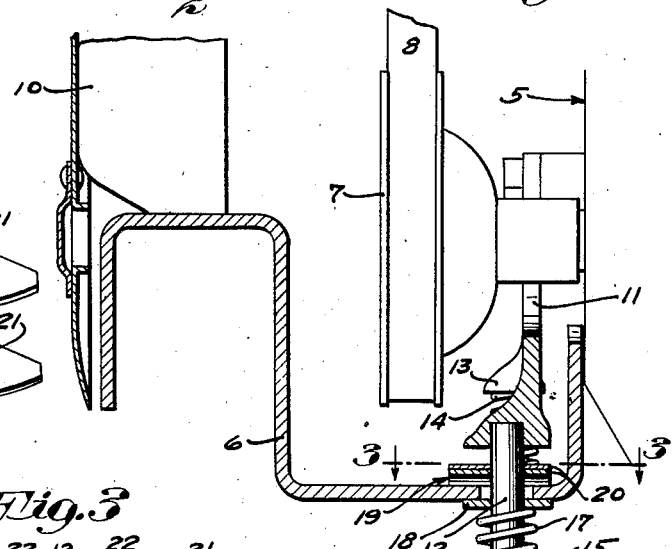
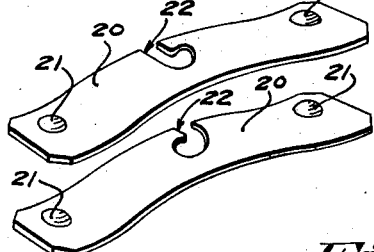
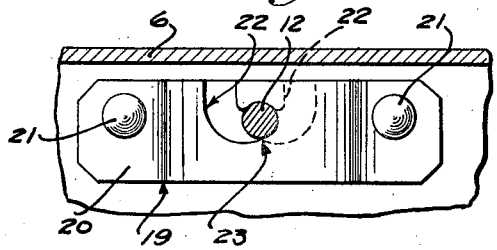
Inventor
William Westling
By his Attorneys
Merchant and Regan Patented Oct. 20, 1931

1,828,452

UNITED STATES PATENT OFFICE

WILLIAM WESTLING, OF MINNEAPOLIS, MINNESOTA

AUXILIARY SPRING FOR AN ENGINE SUPPORT

Application filed October 29, 1930. Serial No. 491,986.

My present invention has for its object the provision of an extremely simple and highly efficient auxiliary spring for an engine support and is especially designed as an improvement on the type of engine front support auxiliary spring used in a Model "A" Ford automobile.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a fragmentary front elevation showing the engine assembly, frame cross member and engine front support assembly;

Fig. 2 is a view partly in side elevation and partly in section taken on the line 2—2 of Fig. 1;

Fig. 3 is a view partly in plan and partly in section taken on the line 3—3 of Fig. 2; and Fig. 4 is a perspective view of the auxiliary spring with the leaves thereof separated.

The invention as illustrated is embodied in a Model "A" Ford automobile as a substitute for the standard engine front support auxiliary spring thereof.

Of the parts of the automobile fragmentarily illustrated, the numeral 5 indicates the engine assembly, 6 the frame cross member, 7 the crank-shaft pulley, 8 the fan belt, 9 the engine front support assembly, and 10 the radiator shell assembly.

The engine front support assembly 9 includes a U-shaped casting 11 the arms of which are detachably secured by screws to the engine assembly 5. This casting 11 has intermediate of its ends a long depending stud 12 and on each side of said stud a spring cap 13. Said assembly 9 further includes two coiled springs 14 and an auxiliary spring, not shown. This auxiliary spring, that comes as a standard part of the automobile illustrated, is in the form of a single leaf that is longitudinally bowed with its end portions resting on the frame cross member 6 and its crown spaced thereabove. Pressed from the auxiliary spring at the ends thereof are upstanding conical spring seats that are directly below the spring caps 13. The stud 12 loosely extends through a central hole in the auxiliary spring and a hole in the frame cross member 6. The coiled springs 14 are held in place by the spring seats on the auxiliary spring and the spring caps 13 and yieldingly support the front of the engine assembly 5 from the frame cross member 6.

A nut 15 is applied to the stud 12 below the frame cross member 6 and held in place by cotter pins 16 and a coiled spring 17 encircling the stud 12 is compressed between a washer 18 on said stud, which engages the under side of the frame cross member 6 as a base of resistance, and the nut 15.

The primary purpose of the auxiliary spring is to act as a buffer between the frame cross member 6 and the casting 11 under extreme relative movements thereof and under such movements it has been found that the auxiliary spring is quite often broken.

By reference to Fig. 2, it will be noted that the frame cross member 6 is a channeled structure into which the engine front support assembly 9 extends as well as the crank-shaft pulley 7, thus making it quite difficult to work on the engine front support assembly.

To replace a broken engine front support auxiliary spring in the Model "A" Ford automobile considerable expense is incurred not in the part itself, as that is quite inexpensive, but in the work and time required to replace the broken spring. It is now necessary in replacing a broken engine front support auxiliary spring to remove the cotter pin 16, nut 15, spring 17 and washer 18 and thereafter loosen the screws of the engine assembly 5 rear support, not shown, loosen the screws connecting the yoke 11 to the engine assembly 5, remove the fan belt, and loosen the fan pulley as well as the pan on the sides of the engine. The next operation is to lift the front end of the engine assembly 5 by means of a jack to a point in which the lower end of the stud 12 is held above the bottom of the frame cross member 6 at an elevation sufficient to permit an auxiliary spring to be placed thereunder by an edgewise movement. The front end of the engine assembly 5 is then lowered by means of the jack to cause the stud 12 to move downward through the central hole in the auxiliary spring and the hole in the bottom of the frame cross member 6. At this time the springs 14 must be placed in position and thereafter the parts tightened that were previously loosened and the parts removed replaced.

The object of this invention is to provide an auxiliary spring that is inexpensive and that can be very easily and quickly applied to the stud 12 by a lateral movement in respect thereto instead of an endwise movement of the stud as is now required to replace a broken standard auxiliary spring.

Referring now in detail to my engine front support auxiliary spring 19, especially designed to take the place of the standard auxiliary spring of a Model "A" Ford automobile, the same includes two spring leaves 20. Each of these leaves 20 has pressed therefrom at the ends thereof two conical spring seats 21 for the springs 14. Formed in each leaf 20 intermediate of its ends and at one of its longitudinal edge portions is a bayonet slot 22. It is important to note that the two bayonet slots 22 are reversely formed so that when the two leaves 20 are assembled the entrance to the bayonet slot 22 in one of said leaves is closed by the body of the other leaf 20. When the two leaves 20 are assembled there is formed therein a central hole 23 for the stud 12 that completely encircles said stud, see Fig. 3.

By reference to Fig. 1 it will be noted that the spring seats 21 in the lower leaf 20 are nested in the spring seats 21 of the upper leaf 20 and thereby hold the two leaves 20 against relative edgewise shifting movement. The springs 14 by their engagement with the upper spring seats 21 are held in place in respect to the auxiliary spring 19. The stud 12 by its extension through the two bayonet slots 22 in the leaves 20 is completely encircled thereby and acts as an anchor for the two leaves 20. Each spring leaf 20 has the same contour and is of the same size as the seats 21 are identical in form and position as the spring seats of said standard spring.

To replace a broken standard auxiliary spring with the auxiliary spring 19, it is only necesary to remove the cotter pin 16, nut 15, spring 17 and washer 18 and lift the front end of the engine assembly 5 by a jack sufficiently to take the weight off from the springs 14 to permit their removal and with sufficient clearance for the auxiliary spring 19 in order to replace the springs 14. The two leaves 20 are successively interlocked with the stud 12 by a compound edgewise movement of each thereof in respect to said stud to bring the innermost portions of the bayonet slots 22 around the stud 12. The bottom leaf 20, of course, rests directly on the bottom of the frame cross member 6 and the upper leaf 20 loosely rests on said lower leaf. As the upper leaf 20 is lowered onto the lower leaf 20 its conical spring seats 21 fit over the conical spring seats 21 on said lower leaf and thereby automatically center the upper leaf on the lower leaf. The springs 14 are next placed in position and the front of the engine assembly 5 lowered by means of the jack and thereafter the parts removed from the stud 12 are replaced.

What I claim is:

1. A device of the class described comprising two spring leaves assembled the one upon the other and each having a notch intermediate of its ends, the notches in the two leaves being formed and arranged, whereby the entrance to the notch in one leaf is closed by the other leaf to leave a central hole through the two leaves.

2. The structure defined in claim 1 which further includes means for holding the two leaves from shifting edgewise the one upon the other.

3. The structure defined in claim 1 in which the two leaves have interlocking engagement to hold the same from shifting edgewise the one upon the other.

4. The structure defined in claim 1 in which each leaf has spring seats at its ends and with the spring seats of one leaf nested in the spring seats of the other leaf to hold the two leaves from shifting edgewise the one upon the other.

5. A device of the class described comprising two spring leaves assembled the one upon the other and each having a bayonet notch intermediate of its ends, the two bayonet notches being reversely formed and arranged, whereby the entrance to the bayonet notch in one leaf is closed by the other leaf to leave a central hole through the two leaves.

6. The structure defined in claim 5 which further includes spring seats pressed from each leaf at the ends thereof and with the spring seats of one leaf nested in the spring seats of the other leaf to hold the two leaves from shifting edgewise the one upon the other.

7. The structure defined in claim 5 which further includes spring seats pressed from each leaf at the ends thereof and with the spring seats of one leaf nested in the spring seats of the other leaf to hold the two leaves from shifting edgewise the one upon the other, said nested seats being separable by a compound movement first longitudinally inward and then laterally.

In testimony whereof I affix my signature.

WILLIAM WESTLING.